(12) United States Patent
Joshi et al.

(10) Patent No.: US 11,735,896 B2
(45) Date of Patent: Aug. 22, 2023

(54) ADAPTER FOR MOUNTING CABLE HANGERS

(71) Applicant: CommScope Technologies LLC, Hickory, NC (US)

(72) Inventors: Aviral Joshi, Chicago, IL (US); Ronald A. Vaccaro, Taylorsville, NC (US); Christopher Stockman, Bella Vista, AR (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/692,401

(22) Filed: Mar. 11, 2022

(65) Prior Publication Data
US 2022/0337040 A1    Oct. 20, 2022

Related U.S. Application Data

(60) Provisional application No. 63/175,186, filed on Apr. 15, 2021.

(51) Int. Cl.
*H02G 3/04* (2006.01)
*F16L 3/14* (2006.01)

(52) U.S. Cl.
CPC .............. *H02G 3/0456* (2013.01); *F16L 3/14* (2013.01)

(58) Field of Classification Search
CPC .. F16L 3/14; F16L 3/137; F16L 3/233; H02G 3/0456
USPC ......................................... 248/71, 74.3, 68.1
See application file for complete search history.

(56) References Cited

U.S. PATENT DOCUMENTS

| | | | |
|---|---|---|---|
| 4,819,897 A * | 4/1989 | Gooding | F16B 7/0433 280/421 |
| 4,993,669 A * | 2/1991 | Dyer | B65D 63/16 248/74.3 |
| 6,536,718 B2 * | 3/2003 | Benito-Navazo | H02G 3/30 411/510 |
| 6,889,944 B2 * | 5/2005 | Brandzel | H02G 3/32 248/65 |
| 7,175,138 B2 | 2/2007 | Low et al. | |
| 8,191,836 B2 | 6/2012 | Korczak | |
| 9,306,380 B2 | 4/2016 | Vaccaro | |
| 9,853,434 B2 | 12/2017 | Vaccaro | |
| 9,866,004 B2 | 1/2018 | Vaccaro et al. | |
| 9,903,510 B2 | 2/2018 | Joshi et al. | |
| 10,803,978 B2 | 10/2020 | Twitchell et al. | |
| 2012/0124782 A1 * | 5/2012 | Elsner | B60R 16/0215 24/115 A |
| 2018/0045336 A1 | 2/2018 | Vaccaro | |
| 2019/0081469 A1 | 3/2019 | Shea et al. | |

(Continued)

OTHER PUBLICATIONS

"International Search Report and Written Opinion corresponding to International Application No. PCT/2022/019930 dated Jun. 29, 2022".

*Primary Examiner* — Christopher Garft
(74) *Attorney, Agent, or Firm* — Myers Bigel, P.A.

(57) ABSTRACT

An adapter for a cable hanger includes: first and second opposed side walls; a ceiling spanning the first and second side walls; and first and second end walls spanning the first and second side walls and merging with the ceiling. At least one of the first and second side walls and the ceiling includes a mounting hole. At least one cradle is mounted to and extends away from one of the first or second side walls, the first or second ends walls, or the ceiling.

15 Claims, 12 Drawing Sheets

(56) References Cited

U.S. PATENT DOCUMENTS

| | | |
|---|---|---|
| 2019/0390796 A1 | 12/2019 | Vaccaro et al. |
| 2020/0185899 A1 | 6/2020 | Leng et al. |
| 2020/0240489 A1 | 7/2020 | Rossetti |
| 2021/0010595 A1 | 1/2021 | Vaccaro |

* cited by examiner

ADAPTER FOR MOUNTING CABLE HANGERS

RELATED APPLICATION

The present application claims priority from and the benefit of U.S. Provisional Patent Application No. 63/175,186, filed Apr. 15, 2021, the disclosure of which is hereby incorporated herein by reference in full.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and other structures. Generally, each cable is attached to a structural member by cable hangers mounted at periodically-spaced attachment points.

Antenna towers may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. Hangers can be "stacked" onto each other by inserting the locking projections of one hanger into the large aperture of the next hanger.

One variety of cable hanger of this type is the SNAP-STAK® hanger, available from CommScope, Inc. (Joliet, Ill.). Other cable hangers are shown in U.S. Pat. Nos. 9,866,004, 9,853,434, and 9,903,510, the disclosures of each of which are hereby incorporated herein by reference in full.

Another available stackable cable hanger is discussed in U.S. Patent Publication No. 2018/0045336 to Vaccaro, the disclosure of which is hereby incorporated herein by reference in its entirety. This cable hanger (versions of which are available from CommScope, Inc. under the name SNAPTAK) is formed of a polymeric material and is typically employed for smaller cables. In addition, the polymeric SNAPTAK hanger can reduce or eliminate passive intermodulation (PIM) near an antenna. PIM, which can negatively impact antenna performance, can be caused by a variety of factors, one of which is metal-to-metal interfaces of components near the antenna. Using a polymeric hanger that is mounted on a metallic antenna mount or other structure can eliminate potential PIM that might otherwise be caused by a metal hanger mounted to a metal antenna leg.

Figure 1:
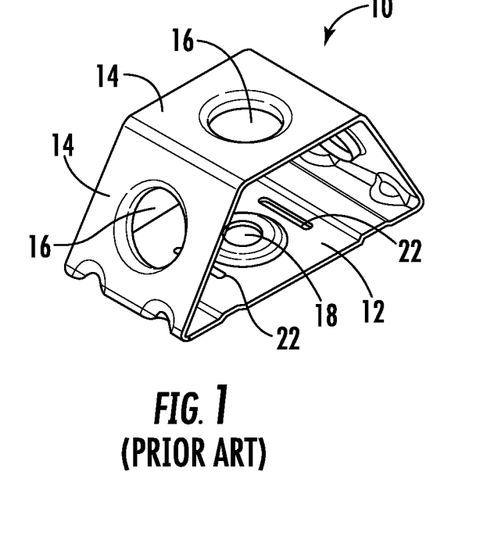
FIG. 1 is a perspective view of a prior art adapter for cable hangers.
Figure 2:
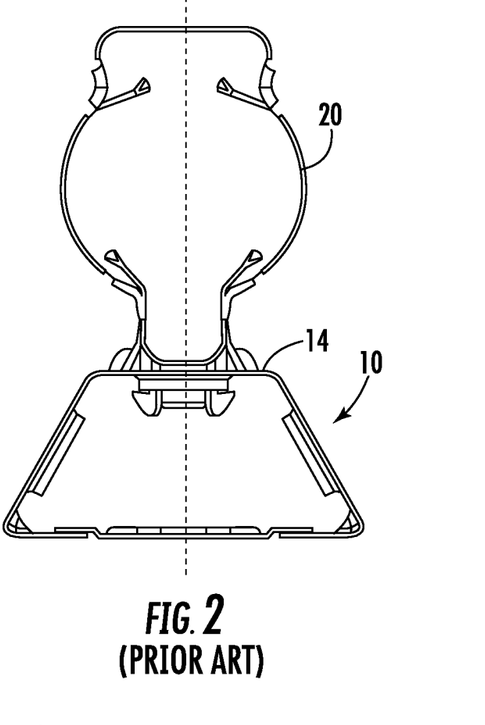
FIG. 2 is a top view of the adapter of FIG. 1 with a cable hanger mounted therein.
Figure 3:
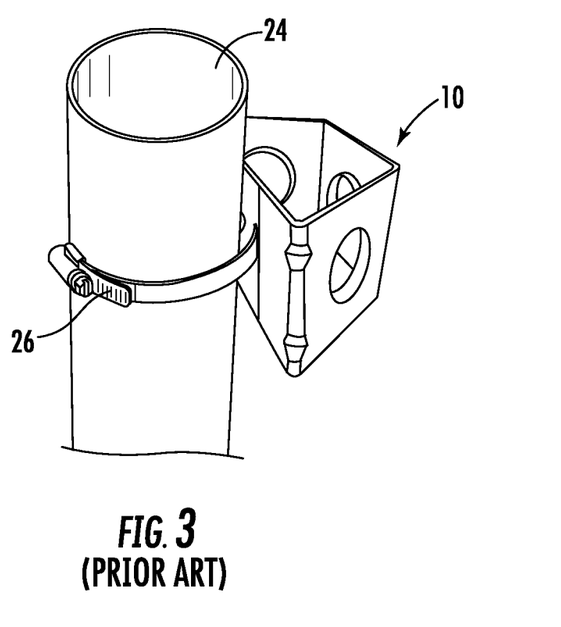
FIG. 3 is a perspective view of the adapter of FIG. 1 mounted to a pole via a hose clamp.
Figure 4:
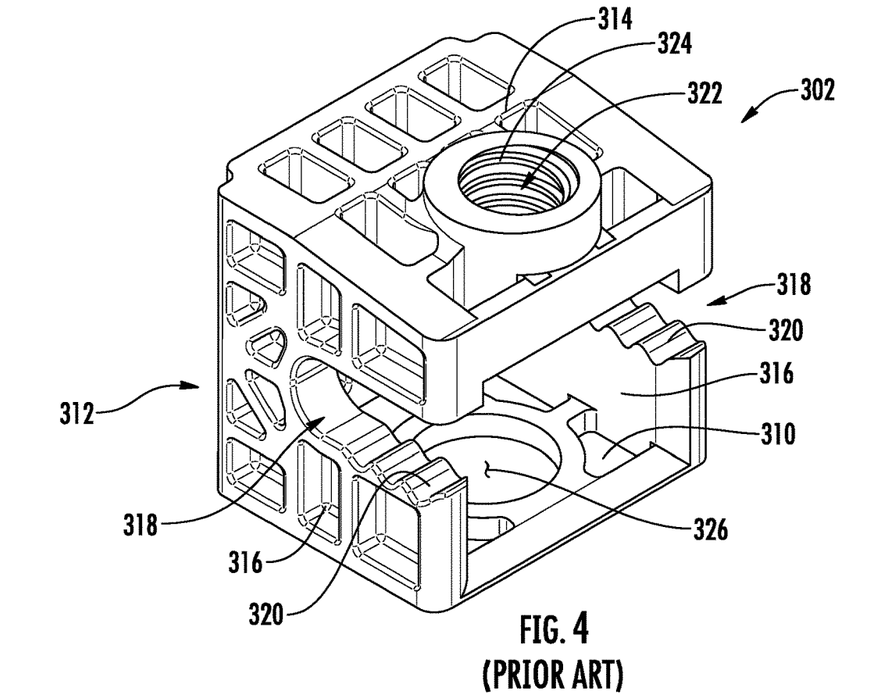
FIG. 4 is a perspective view of a housing of another adapter for a cable hanger.

In some instances, it may be desirable to mount multiple stacks of cable hangers in close proximity. In such instances, it may be desirable to employ an adapter, such as that shown at 10 in FIG. 1. The adapter 10 has a trapezoidal profile, with a base panel 12 and three serially-attached mounting panels 14. Each of the mounting panels 14 includes a mounting hole 16 (typically a nominal ¾ inch hole) that can receive a cable hanger such as those described above, one of which is designated 20 in FIG. 2. The base panel 12 of the adapter 10 has a hole 18 that can be used to mount the adapter 10 to a mounting structure via a bolt. The base panel 12 also includes slots 22 on either side of the hole 18 that can receive a hose clamp 26 or the like to mount the adapter 10 to a pole 24, as shown in FIG. 3. This mounting approach may be desirable when the pole 24 has no pre-formed holes to receive a typical cable hanger.

Figure 5:
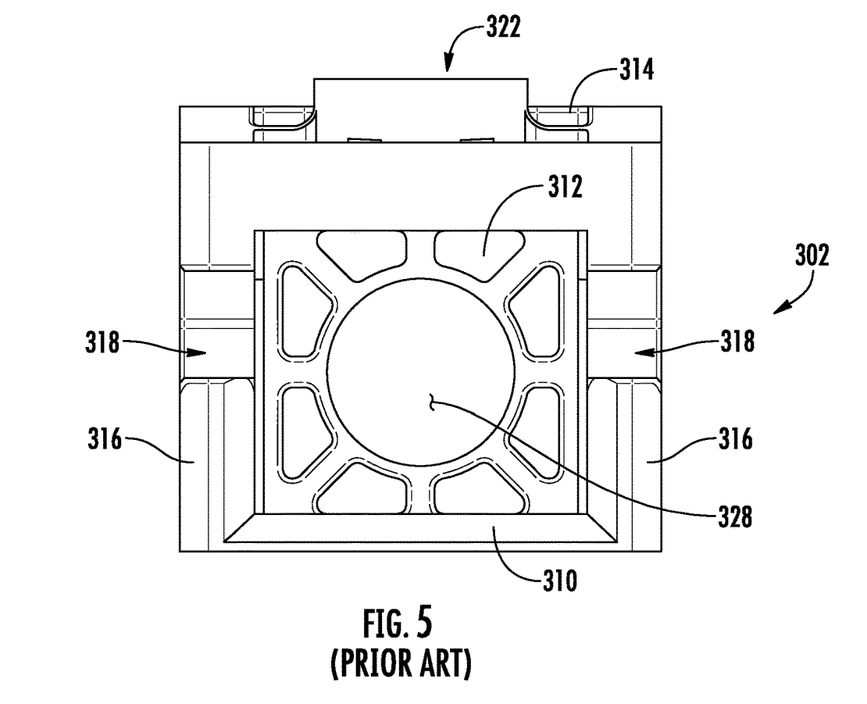
FIG. 5 is a front view of the housing of FIG. 4.

Another prior art adapter 300 is illustrated in FIGS. 4-8 and comprises a housing 302 and a securing screw 304. The housing 302 includes a floor 310, a rear wall 312, a ceiling 314, and side walls 316. These structures are arranged to form generally a cube with an open front side. Each of the side walls 316 has a slot 318 that is open at its front end. Teeth 320 are present in the lower edge of each slot 318 to improve grip. The ceiling 314 has an opening 322 with threads 324. The floor 310 also has a mounting hole 326. As can be seen in FIG. 5, the rear wall 312 has a mounting hole 328 that is sized and configured to receive a cable hanger in the manner of the adapter 10 above. Typically, the mounting holes 326, 328 have a nominal ¾ inch diameter.

Figure 6:
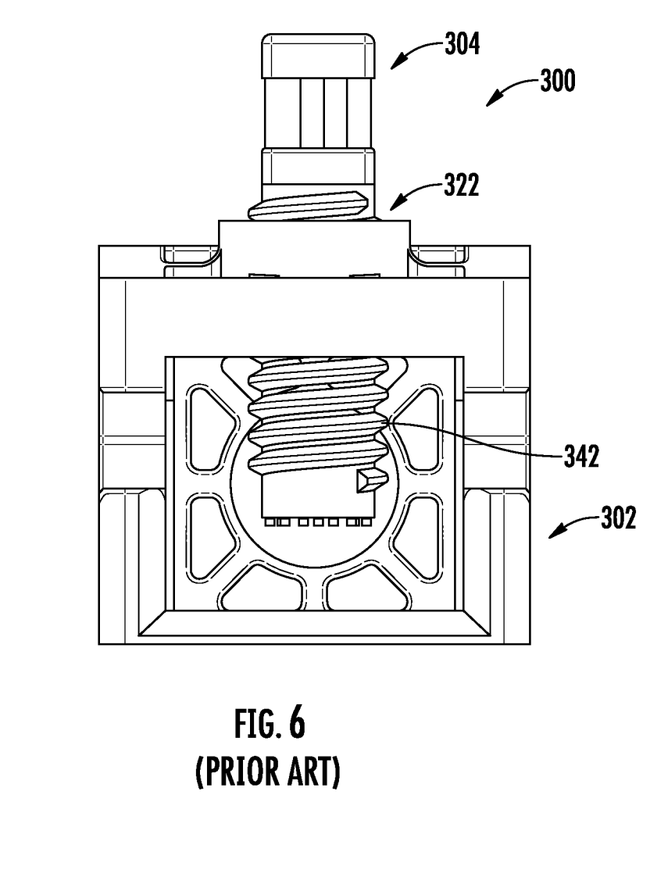
FIG. 6 is a front view of the adapter using the housing of FIG. 4.
Figure 7:
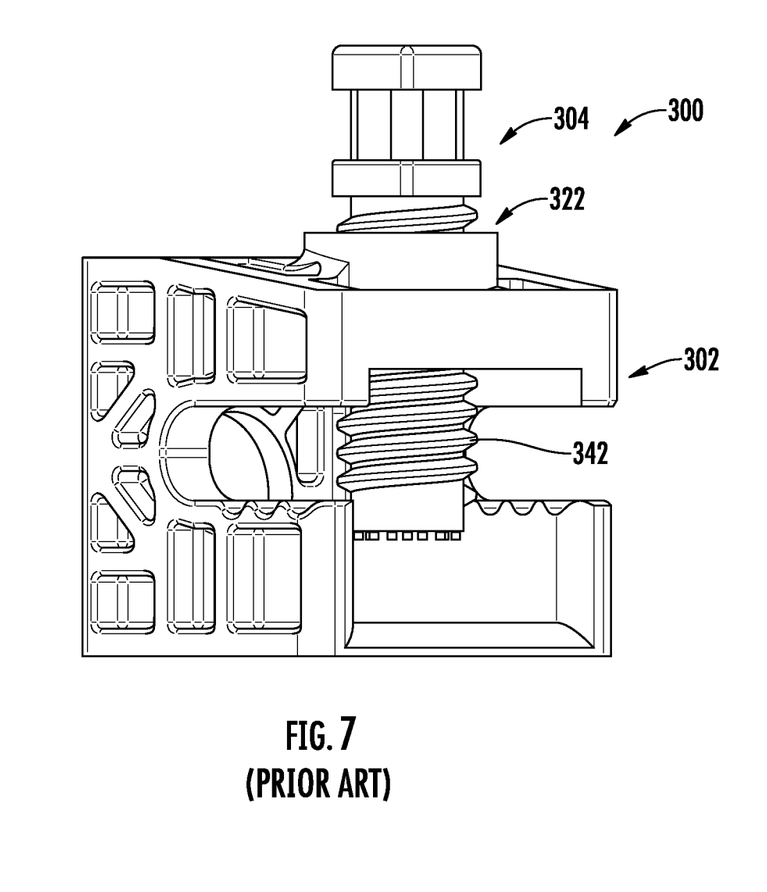
FIG. 7 is a perspective view of the adapter of FIG. 6.
Figure 8:
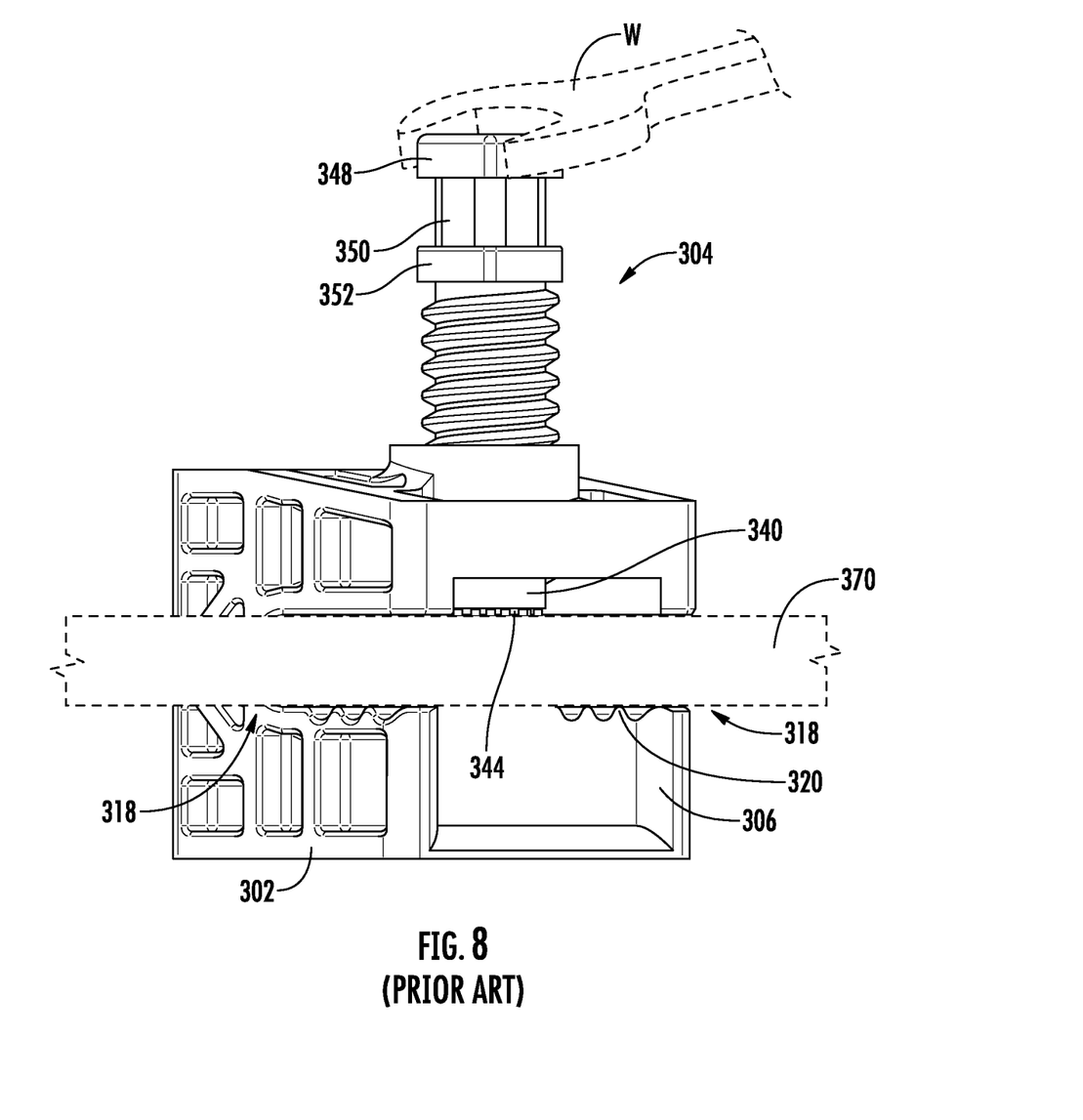
FIG. 8 is a perspective schematic view of the adapter of FIG. 6 mounted on a ladder rung.

As can be seen in FIGS. 6 and 7, the securing screw 304 can be inserted into the opening 322 in the ceiling 314 of the housing 302. The threads 324 of the opening 322 mesh with the threads 342 of the screw 304. Referring now to FIG. 8, the adapter 300 is illustrated mounted on a mounting structure 370, such as the rung of a ladder. The housing 302 of the adapter 300 is attached to the mounting structure 370 by aligning the slots 318 in the side walls 306 of the housing 302 with the mounting structure 370, and slipping the housing 302 onto the mounting structure 370 so that the mounting structure 370 is received in the slots 318. Once the mounting structure 370 is in position in the slots 318, the securing screw 304 is rotated relative to the housing 302 to cause it to advance onto the mounting structure 370. Movement of the securing screw 370 ceases when the lower end of the shaft 340 engages the surface of the mounting structure 370 (see FIG. 7). At this point a cable hanger can be mounted in either of the mounting holes 326, 328.

It may be desirable to provide additional configurations for mounting cable hangers, particularly to structures that may not have pre-formed holes, and particularly in a manner that can reduce or eliminate PIM.

SUMMARY

As a first aspect, embodiments of the invention are directed to an adapter for a cable hanger. The adapter comprises: first and second opposed side walls; a ceiling spanning the first and second side walls; and first and second end walls spanning the first and second side walls and merging with the ceiling. At least one of the first and second side walls and the ceiling includes a mounting hole. Each of the first and second end walls includes an open-ended recess, and the open-ended recess is lined at its upper portion with a thin lip.

As a second aspect, embodiments of the invention are directed to an adapter for a cable hanger comprising: first and second opposed side walls; a ceiling spanning the first and second side walls; and first and second end walls spanning the first and second side walls and merging with the ceiling. At least one of the first and second side walls and the ceiling includes a mounting hole. The adapter further comprises at least one cradle that is mounted to and extends away from one of the first or second side walls, the first or second ends walls, or the ceiling.

As a third aspect, embodiments of the invention are directed to an adapter for a cable hanger comprising: first and second opposed side walls; a ceiling spanning the first and second side walls; and first and second end walls spanning the first and second side walls and merging with the ceiling. At least one of the first and second side walls and the ceiling includes a mounting hole, and one of the end walls and the ceiling includes a feature for engaging a strap.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a,", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 9:
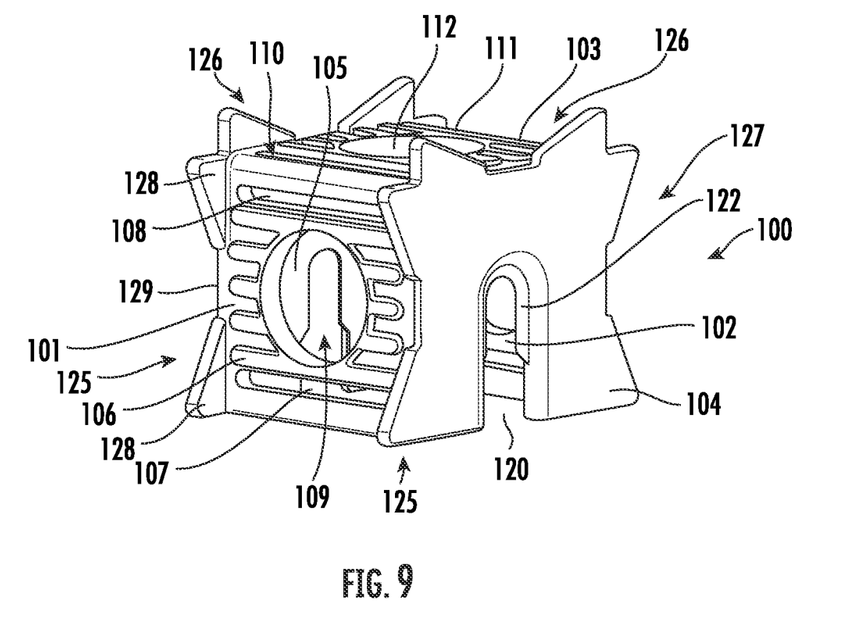
FIG. 9 is a perspective view of a cable hanger adapter according to embodiments of the invention.
Figure 10:
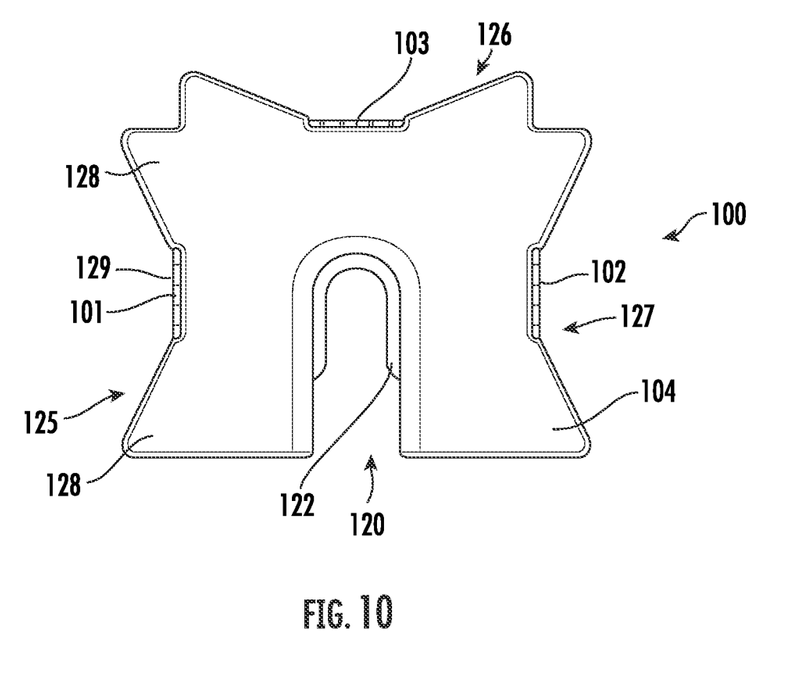
FIG. 10 is an end view of the adapter of FIG. 9.

Referring now to the drawings, an adapter for mounting devices used to hang cables is illustrated in FIGS. 9 and 10 and designated broadly at 100. The adapter 100 includes side walls 101, 102, a ceiling 103 that spans the upper ends of the side walls 101, 102, and two end walls 104, 105 that span the side edges of the side walls 101, 102.

As can be seen in FIG. 9, each of the side walls 101, 102 includes stiffening ribs 106. Each side wall 101, 102 further includes upper and lower slots 108, 107 near its upper and lower edges. Each side wall 101, 102 also includes a mounting hole 109 (typically the mounting hole 109 has a nominal diameter of ¾ inch).

The ceiling 103 also two slots 110, 111 near its side edges. The ceiling 103 also has a mounting hole 112 that is typically nominally ¾ inch in diameter.

Each of the end walls 104, 105 includes an elongate recess 120 that is open at its lower end. The upper end of the recess 120 is semi-circular. A thin lip 122 lines the upper end of and extends inwardly into the recess 120. As a result, the lower end of the recess 120 is wider (typically about ⅜ inch) than the upper end of the recess 120 (typically about ¼ inch).

Each of the end walls 104, 105 also includes three cradles 125, 126, 127 around its edges. Each of the cradles 125, 126, 127 includes two generally triangular supports 128 that are located on either side of a recess 129. Cradles 125 abut the side wall 101, cradles 126 abut the ceiling 103, and cradles 127 abut the side wall 102.

The adapter 100 can be formed of a variety of materials, but is typically formed of a polymeric material. Exemplary polymeric materials include acetal and nylon 6,6. The adapter 100 may be formed in any suitable manner, but ordinarily is injection-molded.

Figure 11:
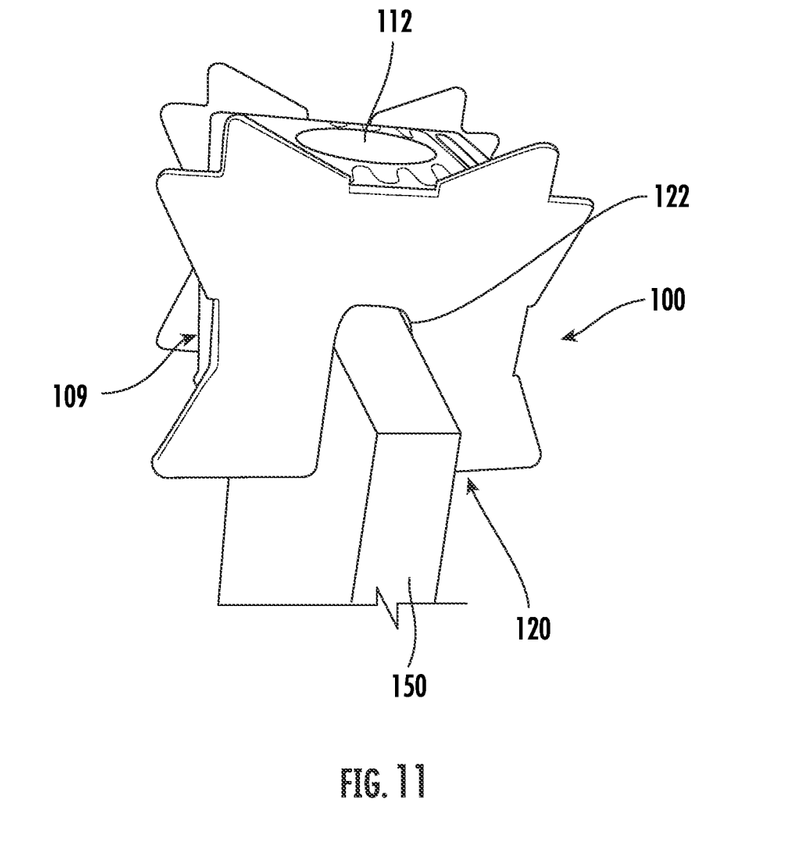
FIG. 11 is an end perspective view of the adapter of FIG. 9 mounted on a mounting structure.

FIG. 11 illustrates the mounting of the adapter 100 on a mounting substrate 150, which may be a shelf, platform, ladder rung, or other structure. As seen in FIG. 11, the recesses 120 receive the mounting substrate 150. For mounting substrates 150 that are wider than the distance between edges of the lip 122, the lip 122 can partially or totally deflect to provide additional grip between the adapter 100 and the mounting substrate 150. Once mounted, the adapter 100 can provide mounting holes 109, 112 as mounting locations for cable hangers such as those discussed above.

Figure 12:
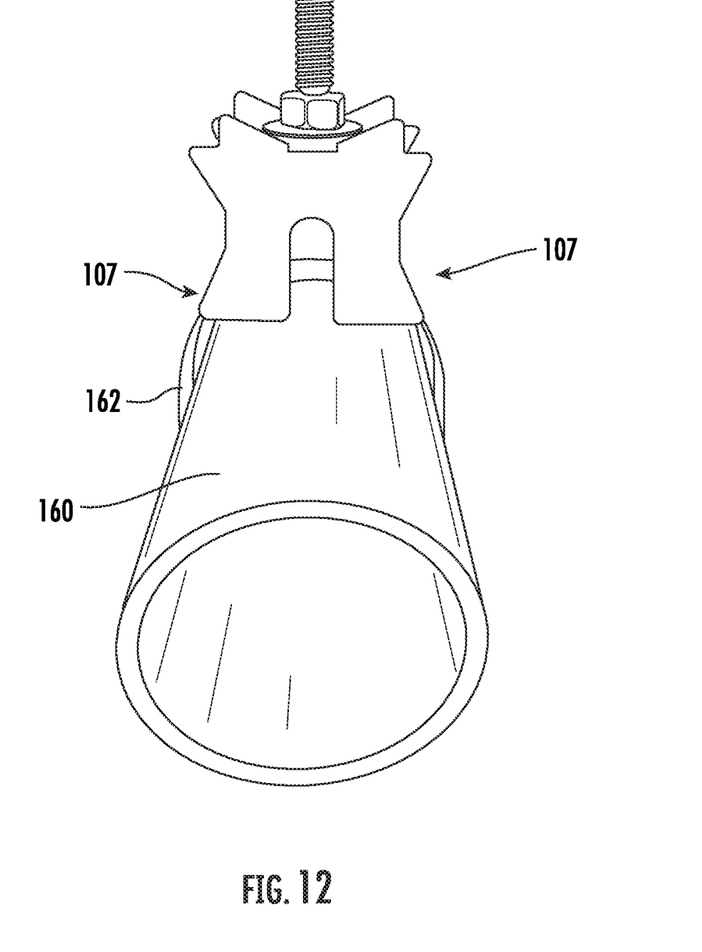
FIG. 12 is an end perspective view of the adapter of FIG. 9 mounted on a pole with a strap.
Figure 13:
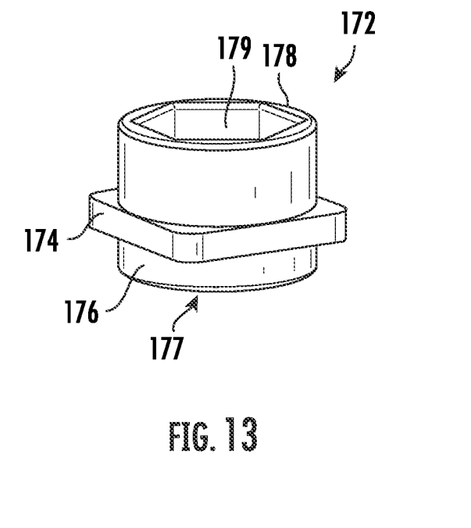
FIG. 13 is a perspective view of an insert usable with the adapter of FIG. 9 to mount a threaded rod on the adapter.
Figure 14:
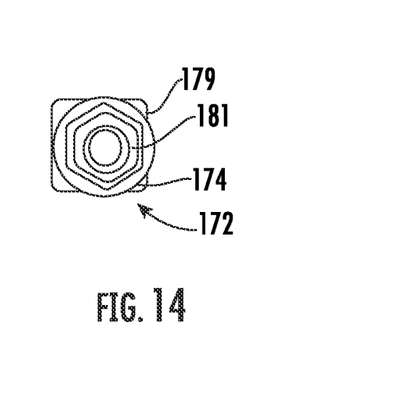
FIG. 14 is an end view of the insert of FIG. 13 with a hex nut inserted in the receptacle.
Figure 15:
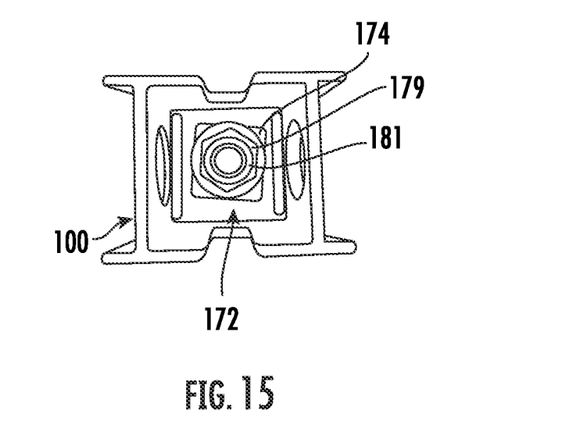
FIG. 15 is a bottom view of the adapter of FIG. 9 with the insert of FIG. 13 in place, and with a threaded rod threaded into the nut captured in the receptacle of the insert.
Figure 16:
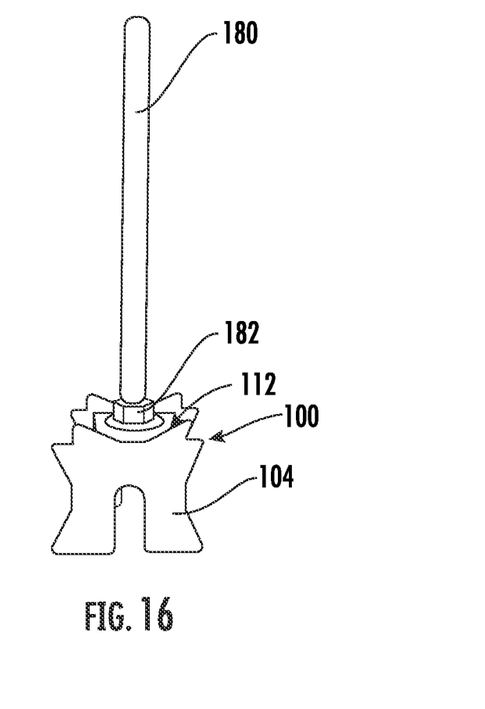
FIG. 16 is an end view of the assembly of FIG. 15.

FIG. 12 illustrates the mounting of the adapter 100 to a pole 160 or other structure using a strap or band 162. As shown in FIG. 12, the strap 162 can be threaded through the lower slots 107 in the side walls 101, 102, then around the pole 160 to secure the adapter 100 to the pole 160. The mounting holes 109, 112 of the adapter 100 can then provide mounting locations for cable hangers (and/or for a threaded rod, as shown in FIG. 12 and discussed below).

FIGS. 13-16 also illustrates how the adapter 100 may be used as a mounting location for a threaded rod 170. An insert 172 (shown in FIG. 13) has a square base 174, a ring 176 with a circular hole 177 extending in one direction from the base 174, and a receptacle 178 with a hexagonal opening 179 extending in the opposite direction from the base 174. The ring 176 fits within one of lie mounting holes 109, 112, with the base 174 abutting the inner surface of the corresponding side wall 101, 102 of ceiling 103. A threaded rod 180 can then be inserted through the hole 177 and into a nut 181 that is captured within the hexagonal opening 179 (see FIGS. 14-16). Because the nut 181 is prevented from rotating by the receptacle 178, the threaded rod 180 can be threaded into the nut 181. The threaded rod 180 can then extend though the opening 177 in the ring 176 and secured with a nut 182 to provide mounting locations for other components, such as C-clamp style cable hangers like those shown in U.S. Pat. No. 7,175,138 to Low et al. (the disclosure of which is hereby incorporated by reference herein in its entirety, and those available from CommScope Technologies, LLC (Hickory, N.C.) under the part designations SHK, DHK, and BHD.

Figure 17:
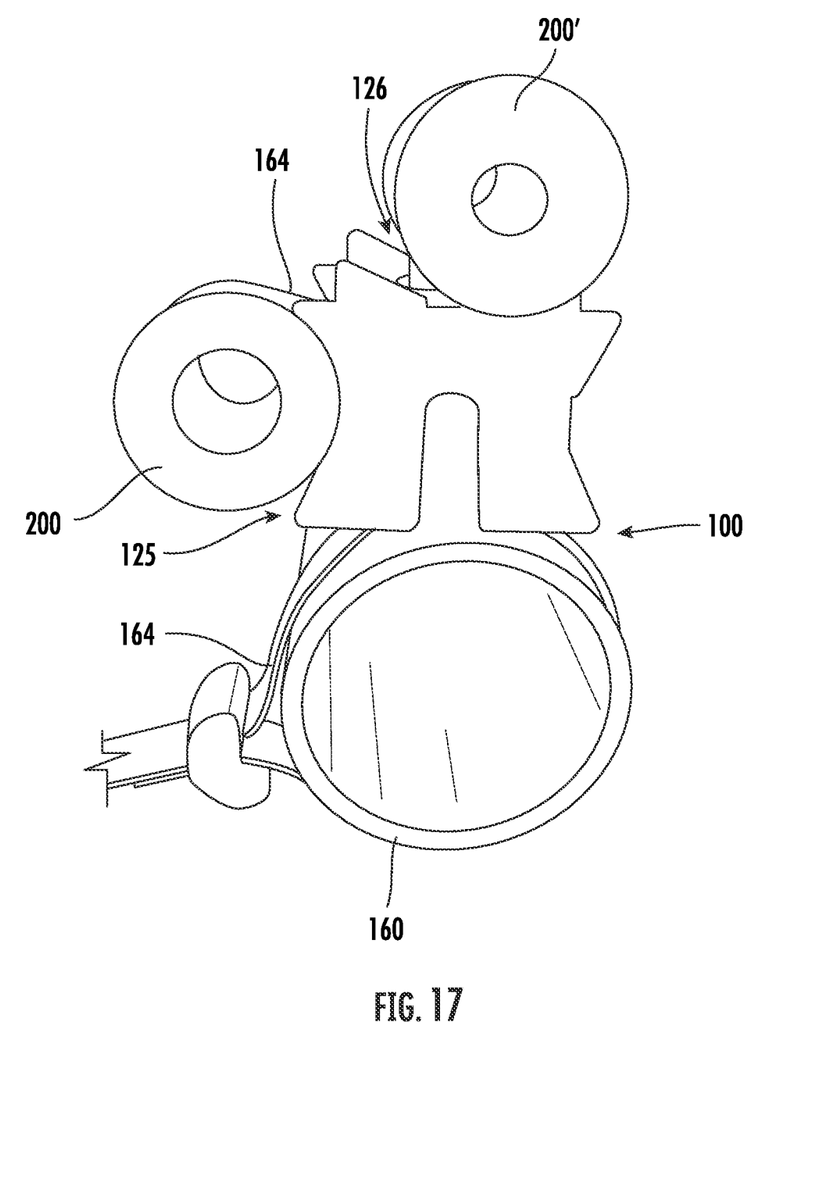
FIG. 17 is an end perspective view of the adapter of FIG. 9 employed for the mounting of two grommets, wherein the adapter is mounted to a pole via a strap.

FIG. 17 illustrates how that adapter 100 can be used as a mounting foundation for one or more grommets 200 that can, in turn, be employed to grasp cables. Grommets are typically cylindrical with a hollow center and axial slit to enable the grommet to be fitted over a cable. In many instances, grommets are used in conjunction with cable hangers to grasp cables (see, e.g., U.S. Pat. No. 9,306,380 to Vaccaro, U.S. Pat. No. 10,803,978 to Wang, and U.S. Patent Publication No. 2021/0010595 to Vaccaro, the disclosures of which are hereby incorporated herein by reference in full). The adapter 100 can provide mounting locations for cable hangers that utilize grommets, but can also provide mounting locations for grommets themselves without cable hangers.

In FIG. 17, grommets 200, 200' have been positioned in the cradles 125, 126. A strap 164 can be routed around a pole 160, through the lower slot 107 of the side wall 101, around the first grommet 200, through the upper slot 108 of the side wall 101, through the slot 110 of the ceiling 103, around the second grommet 200', through the slot 111 in the ceiling 103, and through the interior of the adapter 100 back to the pole 160. Cables (not shown) can then be captured within the interior cavities of the grommets 200, 200'. Of course, either of the grommets 200, 200' may be used by itself, or a third grommet positioned in the cradle 127 may be added.

Figure 18:
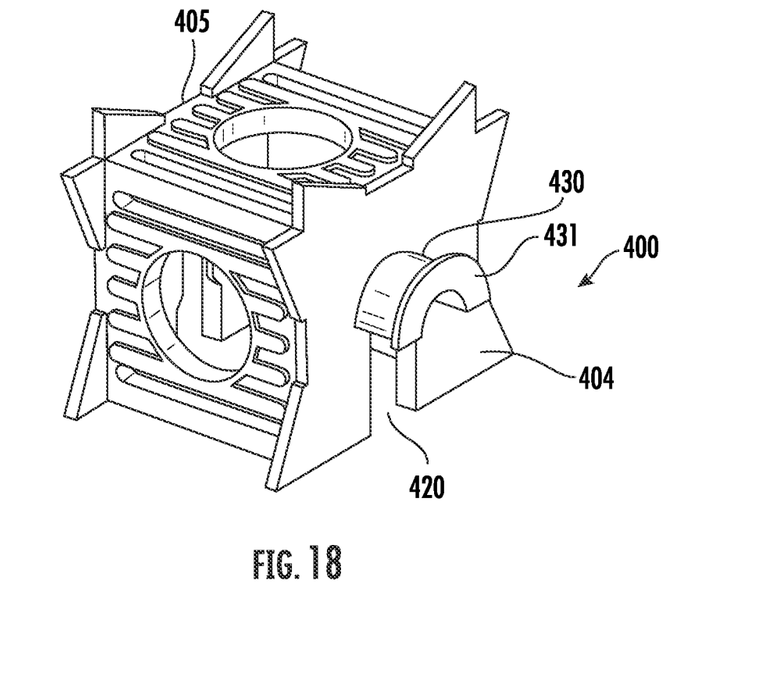
FIG. 18 is a perspective view of a cable hanger adapter according to alternative embodiments of the invention.
Figure 19:
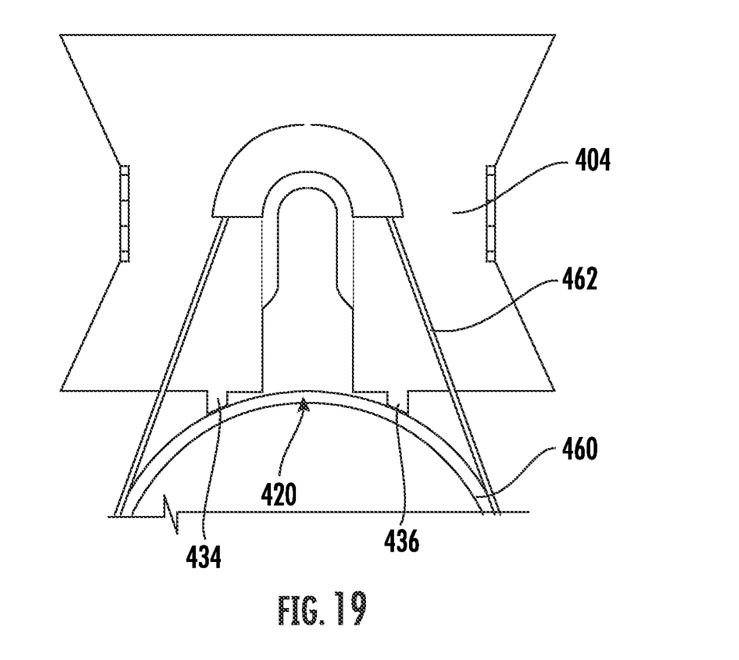
FIG. 19 is an end view of the adapter of FIG. 18.

Those skilled in this art will appreciate that the adapter 100 may take different forms. One example is illustrated in FIGS. 18 and 19 and is designated broadly at 400. The adapter 400 is similar to the adapter 200, but includes two semicylindrical flanges 430, each with a lip 431. The flanges 430 are mounted to and extend from the end walls 404, 405 just above the recesses 420. The flanges 430 provide an alternative feature that can engage a strap or band 462 to attach the adapter 400 to a pole 460 or other mounting structure.

Figure 20:
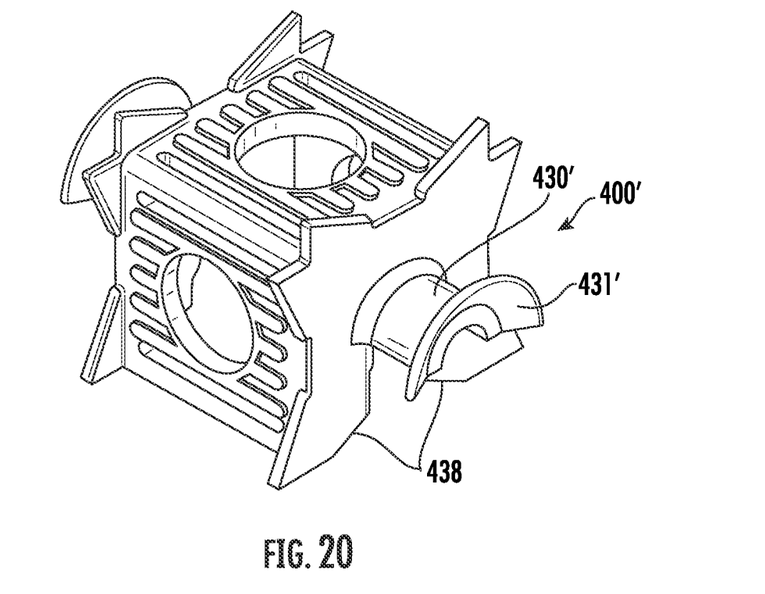
FIG. 20 is a perspective view of a cable hanger adapter according to additional embodiments of the invention.

In addition, the adapter 400 includes feet 434 with angled surfaces 436 that extend from the lower edges of the end walls 404, 405. As shown in FIG. 20, the angled surfaces 436 of the feet 434 can improve the engagement of the adapter 400 to the pole 460.

Figure 21:
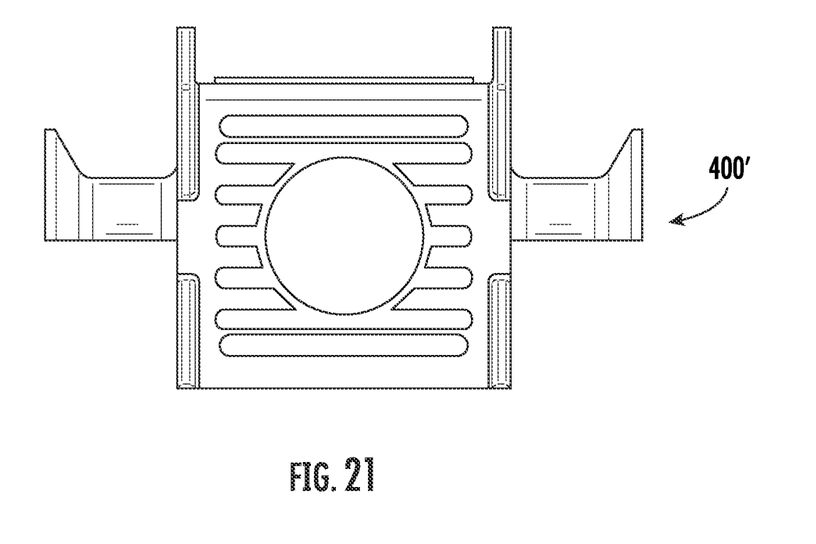
FIG. 21 is a side view of the adapter of FIG. 20.

A slightly different version of the adapter 400 is shown in FIGS. 20 and 21 and designated broadly at 400'. The adapter 400' has somewhat deeper flanges 430' and larger and generally conical lips 431'. In addition, the adapter 400' has chamfered lower surfaces 438 to improve engagement of the adapter 400' with a pole to which it is mounted.

Figure 22:
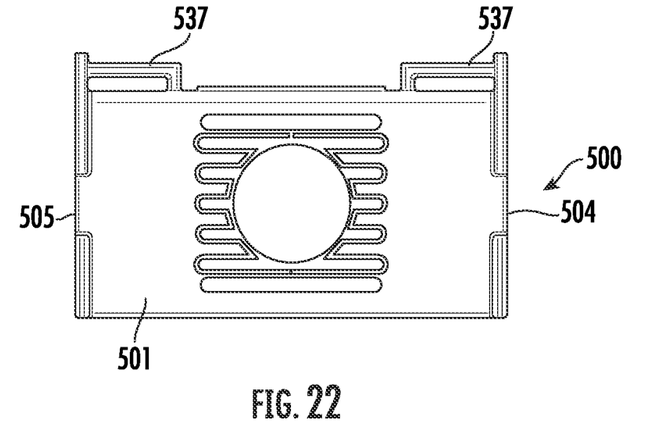
FIG. 22 is a side view of a cable hanger adapter according to further embodiments of the invention.
Figure 23:
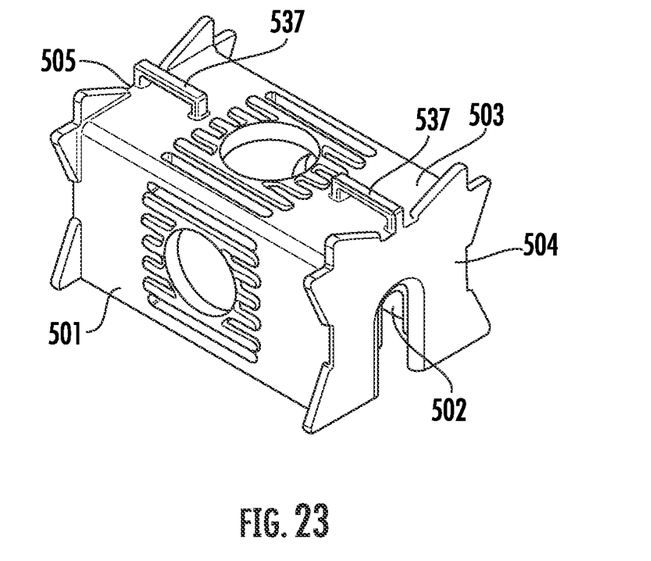
FIG. 23 is a perspective view of the adapter of FIG. 20.

FIGS. 22 and 23 illustrate another embodiment of an adapter, designated broadly at 500. The adapter 500 is similar to the adapter 100, but the side walls 501, 502 span a greater distance between the end walls 504, 505. Also, two rectangular loops 537 extend upwardly from the ceiling 503 on each side of the mounting hole 512. The loops 537 can provide an additional feature that can be used to engage straps or hands to mount the adapter 500 to a pole or other structure.

Those of skill in this art will appreciate that the adapters 100, 400, 500 may take other forms. For example, although the side walls of each adapter are illustrated as being substantially perpendicular to the ceiling, in some embodiments the side walls may be canted somewhat. Similarly, the end walls may be inclined or canted relative to the ceiling. Moreover, any of the side walls, end walls or ceiling may have an arcuate, rather than flat, profile.

The locations of the mounting holes, slots, and/or recesses may differ. This may particularly occur if the shapes and/or relative orientations of the side walls, end walls and ceiling differ as described above.

Further, it is contemplated that the cradles may have a shallower or deeper profile. Moreover, rather than being extensions of the end walls, the cradles may be mounted to and extend from the side walls and/or the ceiling in some embodiments. Other alternatives may also be suitable.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An adapter for a cable hanger, comprising:
   first and second opposed side walls;
   a ceiling spanning the first and second side walls;
   first and second end walls spanning the first and second side walls and merging with the ceiling;
   wherein each of the first and second side walls and the ceiling includes a mounting hole having a nominal ¾ inch diameter;
   wherein each of the first and second end walls includes an open-ended recess, and wherein the open-ended recess is lined at its upper portion with a thin lip.

2. The adapter defined in claim 1, wherein each of the first and second side walls include upper and lower slots with longitudinal axes that are generally parallel with the ceiling.

3. The adapter defined in claim 2, wherein the ceiling includes first and second slots with longitudinal axes that are generally parallel with the longitudinal axes of the upper and lower slots of the first and second side walls.

4. The adapter defined in claim 1, wherein each of the first and second end walls includes a cradle that extends away from one of the first or second side walls or the ceiling.

5. The adapter defined in claim 4, where each of the first and second end walls includes three cradles, wherein a first of the three cradles abuts the first side wall, a second of the three cradles abuts the second side wall, and a third of the three cradles abuts the ceiling.

6. The adapter defined in claim 4, wherein a grommet engages the cradle.

7. The adapter defined in claim 6, wherein the grommet is secured to the adapter via a strap.

8. An adapter for a cable hanger, comprising:
first and second opposed side walls;
a ceiling spanning the first and second side walls;
first and second end walls spanning the first and second side walls and merging with the ceiling;
wherein at least one of the first and second side walls and the ceiling includes a mounting hole; and
further comprising is six cradles, wherein three of the six cradles extend from each of the first and second end walls, wherein a first of the three cradles abuts the first side wall, a second of the three cradles abuts the second side wall, and a third of the three cradles abuts the ceiling.

9. The adapter defined in claim 8, wherein a grommet engages the cradles.

10. The adapter defined in claim 9, wherein the grommet is secured to the adapter via a strap.

11. The adapter defined in claim 8, wherein each of the first and second side wall and the ceiling includes a mounting hole.

12. The adapter defined in claim 11, wherein each of the mounting holes has a nominal ¾ inch diameter.

13. The adapter defined in claim 8, wherein each of the first and second side walls include upper and lower slots with longitudinal axes that are generally parallel with the ceiling.

14. The adapter defined in claim 13, wherein the ceiling includes first and second slots with longitudinal axes that are generally parallel with the longitudinal axes of the upper and lower slots of the first and second side walls.

15. An adapter for a cable hanger, comprising:
first and second opposed side walls;
a ceiling spanning the first and second side walls;
first and second end walls spanning the first and second side walls and merging with the ceiling;
wherein at least one of the first and second side walls and the ceiling includes a mounting hole;
wherein each of the end walls includes a recess that is open at an end opposite the ceiling; and
wherein each of the end walls includes a semicylindrical flange extending from each of the first and second end walls, wherein each of the flanges is adjacent a closed end of a respective recess and has a radially outward upper surface for engaging a strap.

* * * * *